United States Patent [19]
Daub et al.

[11] Patent Number: 5,268,617
[45] Date of Patent: Dec. 7, 1993

[54] POWER-SUPPLY APPARATUS FOR STARTING AND OPERATING A HIGH-PRESSURE GAS DISCHARGE LAMP

[75] Inventors: Wolfgang Daub, Lippstadt; Friedrich-Karl Wendt, Salzkotten, both of Fed. Rep. of Germany

[73] Assignee: Hella KG Hueck & Co., Lippstadt, Fed. Rep. of Germany

[21] Appl. No.: 947,460

[22] Filed: Sep. 21, 1992

[30] Foreign Application Priority Data

Sep. 21, 1991 [DE] Fed. Rep. of Germany ........ 4131528

[51] Int. Cl.$^5$ ..................... H05B 37/02; B60Q 1/02
[52] U.S. Cl. ..................... 315/308; 315/82; 315/307; 315/224; 307/10.8
[58] Field of Search ............. 315/82, 224, 227 R, 315/291, 307, 308, 360; 307/10.8; 362/80

[56] References Cited

U.S. PATENT DOCUMENTS 4,240,009 12/1980 Paul ..................... 315/224
5,036,256 7/1991 Garrison et al. ............ 315/308
5,103,143 4/1992 Daub ..................... 315/308

FOREIGN PATENT DOCUMENTS

4015398A1 11/1991 Fed. Rep. of Germany .

*Primary Examiner*—Robert J. Pascal
*Assistant Examiner*—Arnold M. Kinkead
*Attorney, Agent, or Firm*—Griffin, Butler, Whisenhunt & Kurtossy

[57] ABSTRACT

A power-supply apparatus, or ballast, for starting and operating a high-pressure gas discharge lamp is fed from a battery and has at least one current- and/or power-controlled voltage converter which is coupled to a high-pressure gas discharge lamp via an ignition device and to a current/power control device via input and output terminals. A comparator of the current/-power control device produces a switching signal dependent upon a lamp voltage input signal, and a capacitor, dependent upon the switching signal, is charged with a circuit having a first time constant and discharged with a circuit having a second time constant. The charge voltage of the capacitor is applied to the output to determine the level and duration of additional power supplied to the high-pressure gas discharge lamp after ignition. When the power-supply apparatus is turned off, the capacitor is coupled to a second reference voltage source and is charged by means of the first time constant. The comparator produces, when the power-supply apparatus is switched on, a switching signal when a lamp voltage limit is exceeded.

9 Claims, 1 Drawing Sheet 5,268,617

POWER-SUPPLY APPARATUS FOR STARTING AND OPERATING A HIGH-PRESSURE GAS DISCHARGE LAMP

BACKGROUND OF THE INVENTION

The invention generally relates to a power-supply apparatus for starting and operating high-pressure gas discharge lamps, which is fed from a battery, and which has at least one current- or power-controlled voltage converter coupled to a high-pressure gas discharge lamp via an ignition device and to a current/power control device via an input terminal, to which is applied an input signal corresponding to lamp voltage, and an output terminal through which a current/power nominal, or desired, value is supplied to the voltage converter; wherein the current/power control device comprises a comparator which produces a switching signal dependent upon the input signal and a capacitor which, dependent upon the produced switching signal, is charged with a first time constant or discharged with a second time constant and whose voltage determines the level and duration of an additional voltage supplied after ignition of the high-pressure gas discharge lamp, which in turn depends upon an operational status of the high-pressure gas discharge lamp and is limited by its allowable maximum lamp current.

From German patent application no. P 40 15 398, which is not prior art, a power-supply apparatus for starting and operating high-pressure gas discharge lamps is known wherein the power-supply apparatus is fed from a battery of a motor vehicle. The known power-supply apparatus has a current- and power-controlled voltage converter which is an ac-converter to produce an ac-voltage from a dc-voltage applied from the vehicle battery. The voltage converter is coupled to a high-pressure gas discharge lamp via an ignition device. The voltage converter is coupled to a current/power control device for regulating the allowable maximum current and power supplied to the high-pressure gas discharge lamp. Also, the current/power control device has an output terminal through which a current/power nominal, or desired, value is fed to the voltage converter. In order for the high-pressure gas discharge lamp to reliably reach an active operational status as quickly as possible after ignition, the current/power control device has a circuit arrangement by means of which the high-pressure gas discharge lamp is supplied, immediately after ignition, with additional power from the voltage converter, dependent upon a respective operational status of the high-pressure gas discharge lamp and limited by its allowable maximum lamp current. In this respect, the known circuit arrangement has a comparator, which produces a switching signal dependent upon the charging state of a first capacitor, and a second capacitor, which, dependent upon a produced switching signal, is charged at a first time constant or discharged at a second time constant, wherein the voltage of the capacitor determines the level and duration of the additional power supplied to the high-pressure gas discharge lamp. The first capacitor is charged and also discharged by means of a third time constant which determines the time period during which the second capacitor is not discharged.

With the known power-supply apparatus for ignition and operation of high-pressure gas discharge lamps, it has proven to be of disadvantage that the circuit arrangement of the current/power control device, which determines the duration and level of the additional power supplied to the high-pressure gas discharge lamp, is constructed in a cost-intensive manner thereby causing high costs in overall manufacture. In the known circuit arrangement of the power-supply apparatus, two capacitors are coupled with resistors to have various time constants for their charging and discharging and three operational amplifiers and two circuit arrangements are used for the determination of additional power. Also, it proves to be of disadvantage that in the known current/power control device a status-determination device is required which determines whether the high-pressure gas discharge lamp is operating. It has been known to be particularly disadvantageous in the known current/power control device that the first capacitor, which determines the level and duration of the additional voltage to be supplied to the high-pressure gas discharge lamp immediately after ignition, is discharged if the power-supply apparatus is not activated and is charged if the power-supply apparatus is activated so that upon the occurrence of residual, or leakage, currents of the first capacitor, the first capacitor cannot reach a desired charging state during steady operation, thereby not maintaining lamp nominal power.

It proves to be especially disadvantageous that the point in time of reducing additional power is determined by a lamp-independent time constant.

It is an object of this invention to provide a power-supply apparatus which can be manufactured uncomplicatedly and cost-effectively and has a power-control device which ensures optimal ignition and reliable steady operation of a lamp.

SUMMARY OF THE INVENTION

The object of this invention is achieved in that an output terminal of a current/power control device is coupled to a capacitor and a first reference voltage source via a voltage divider circuit, that the capacitor, when the power-supply apparatus is not activated, is coupled to a second reference voltage source and is charged with a first time constant, and that after activation of the power-supply apparatus, when a lamp voltage limit is exceeded (which is determined by an allowable maximum ignition current and an allowable maximum lamp ignition power), a comparator produces a switching signal which couples the capacitor to ground via a resistor for discharging it with a second time constant.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
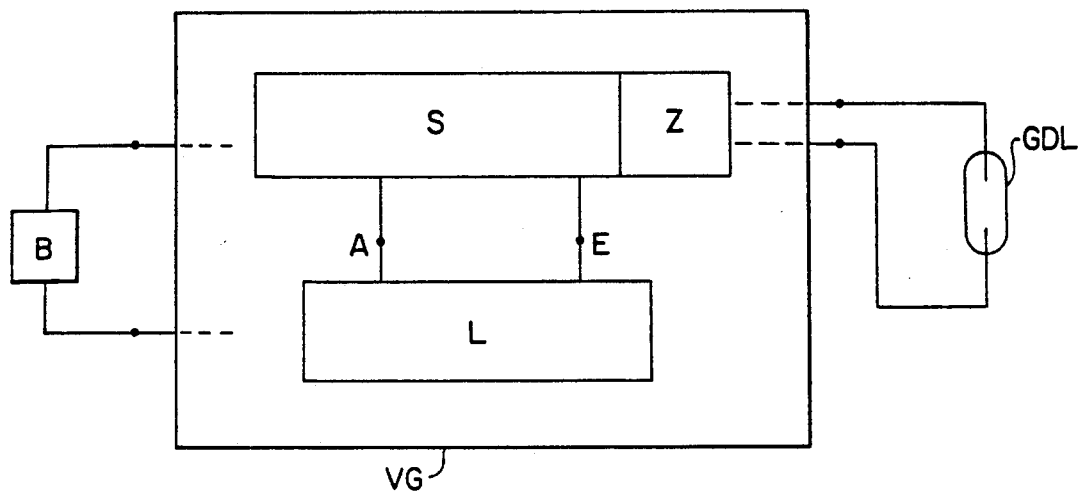
FIG. 1 is a block diagram of a power-supply apparatus of this invention for ignition and operation of high-pressure gas discharge lamps.

One embodiment of this invention is depicted in the drawings and will be described in the following using the drawings.

FIG. 1 depicts a block diagram of a power-supply apparatus, or ballast, VG of this invention for ignition and operation of a high-pressure gas discharge lamp GDL. The power-supply apparatus VG is fed by a battery B which, for example, can be the vehicle battery of a motor vehicle. The power-supply apparatus has at least one current- and/or power-controlled voltage converter S which is coupled to the high-pressure gas discharge lamp GDL via an ignition device Z. In this embodiment, the ignition device Z is integrated into the power-supply apparatus VG, in another embodiment the ignition device Z can also be arranged separately.

In the depicted embodiment, the at least one current- and power-controlled voltage converter S is a dc/dc converter downstream of which is arranged a bridging switch, or converter, (not depicted) for driving an ac high-pressure gas discharge lamp GDL. In another embodiment, wherein a dc high-pressure gas discharge lamp is to be operated, the downstream-arrangement of the bridge switch, or dc-ac converter, is not required.

Independently of a particular embodiment, the at least one current- and/or power-controlled voltage converter S is coupled to a current/power control device L. The current/power control device L has an input terminal E to which is applied an input signal corresponding to the lamp voltage. The current/power control device L has an output terminal A through which a current/power desired value is supplied to the voltage converter S. In particular, immediately after ignition of the high-pressure gas discharge lamp, it must be fed increased power, that is, additional power, in order to reach as quickly as possible a stable, quiescent operational status without flickering.

Figure 2:
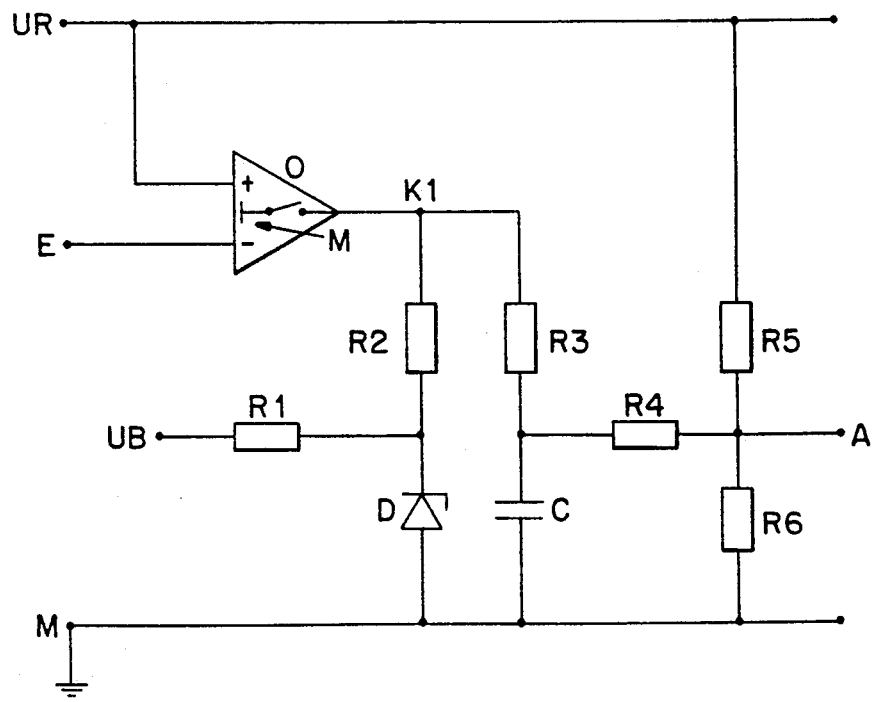
FIG. 2 is a switching circuit of a current/power control device of the power-supply apparatus of this invention.

To achieve this goal, the current/power control device L, depicted in FIG. 2, is a switching arrangement for about additional power immediately after ignition of the high-pressure gas discharge lamp GDL, dependent upon the lamp operational status and limited by allowable maximum lamp current.

A first electrode of a capacitor C, whose voltage determines a level, and a time-related curve, of additional power to be fed to the high-pressure gas discharge lamp GDL, is coupled to ground M. A second electrode of the capacitor C is coupled to the output terminal A via a fourth resistor R4 and to a first terminal K1 via a third resistor R3. The first terminal K1 is coupled to an output terminal of a comparator O and, via a second resistor R2 and a first resistor R1, to a voltage source UB which, for example, can be a motor vehicle battery. The voltage source UB/is coupled to ground M via a first resistor R1 and a Z(Zener)-diode D, which serves as a voltage stabilizer together with the first resistor R1. An inverting input terminal of the comparator O is coupled to the input E to which is applied an input signal corresponding to a lamp voltage. A non-inverting input terminal of the comparator O is coupled to a reference voltage source UR. In this embodiment, the comparator O has an output terminal which, is either open or coupled to ground M, depending upon a switching status of the comparator O. The output terminal A is coupled to ground M via a sixth resistor R6 and to the reference voltage source UR via a fifth resistor R5. Thus, the output terminal A is coupled to the reference voltage source UR as well as to the capacitor C via a voltage divider circuit which combines the voltage signals of the reference voltage source UR and the capacitor C in a most uncomplicated manner. In another embodiment, the voltage stabilizer R1 and D can also be a voltage control device. In a further embodiment, the voltage source UB can also be the reference voltage source UR. It is beneficial for the capacitor C to be a tantalytic capacitor whereby the nominal values of the capacitor C can be maintained most reliably even at high temperatures.

In the following, operation of the invention is briefly described according to FIG. 2.

In a switched-off power-supply apparatus, or ballast, VG, the capacitor C is charged via the second resistor R2 and the third resistor R3 from a second reference voltage source, or the voltage stabilizer, R1, D, which is fed from the voltage source UB.

Upon placing the power-supply apparatus VG in operation, the high-pressure gas discharge lamp GDL of FIG. 1 is ignited by a voltage provided by the at least one voltage converter S and the ignition device Z. An input signal corresponding to the lamp voltage is applied to the input terminal E of the switching arrangement (current/power control device) of FIG. 2. This input signal of the input terminal E is compared by the comparator O with the reference voltage from the reference voltage source UR. If the lamp voltage exceeds the lamp voltage limit (such as 29 Volts for example), which depends upon an allowable maximum lamp ignition current and an allowable maximum lamp ignition power, the comparator O produces a switching signal which couples the capacitor C to ground via the third resistor R3. The capacitor C is discharged by means of a second time constant via the third resistor R3. Dependent upon a first time constant, which is determined by the second resistor R2, the third resistor R3 and the capacitance of the capacitor C, the capacitor C was charged while the ballast was switched off, depending upon the amount of time during which the power-supply apparatus VG was switched off, according to an exponential voltage function determined by the first and second reference voltages as well as the resistors R3–R6 and a load at the output terminal A. Corresponding to the voltage level of the capacitor C, a current/power nominal value is applied to the output terminal A, its level being determined by the operational status of the high-pressure gas discharge lamp GDL. The signal applied to the output terminal A is made up of the voltage signal, which is applied by the capacitor C via the fourth resistor R4, the voltage signal, which is applied by the reference voltage source UR via the fifth resistor R5 and a reference potential, which is produced by coupling of the output terminal A to ground M via the sixth resistor R6. This voltage divider, or mixer, arrangement provides a signal summing circuit in an uncomplicated manner, which ensures that during quiescent operation of the high-pressure gas discharge lamp GDL the output terminal A is supplied a predetermined current/power nominal, or desired, value corresponding to the reference voltage from the first reference source UR, and that during the ignition phase of the high-pressure gas discharge lamp a voltage value is added which is provided by the voltage from the capacitor C. The time constant for charging and discharging the capacitor C ensures that the high-pressure gas discharge lamp is supplied with additional power dependent upon the switch-off time and the duration of the last switch-on time and adjusted to the operational status. The instant that additional power is reduced to a normal level is determined only on the basis of the measured lamp voltage, thereby providing a particularly uncomplicated, cost-effective and reliable arrangement. Additional power supplied to the high-pressure gas discharge lamp GDL is continually reduced due to the second time constant with which the capacitor C is discharged.

It is beneficial that the output terminal of the current/power control device is coupled to the capacitor and a first reference voltage source via a voltage divider circuit, because this ensures that during steady, or quiescent, operation of the high-pressure gas discharge lamp a defined power nominal, or desired, value is applied to the output terminal of the current/power control device and during start-up operation a current/power desired value is applied to the output terminal dependent upon which an additional power is supplied to the high-pressure gas discharge lamp which is dependent upon an operational status and the allowable maximum lamp current whereby a combining of voltage values can be accomplished particularly uncomplicatedly and cost-effectively.

An uncomplicated and reliable circuit arrangement is provided in that the capacitor, when the power supply apparatus is not activated, is coupled to a second reference voltage source and is charged with a first time constant. This circuit arrangement can measure the switch-off time of the power-supply apparatus and thereby of the high-pressure gas discharge lamp, therein determining the maximum additional power as being that corresponding to a voltage of the fully charged capacitor.

It is beneficial that, after switching on the power supply apparatus, in case a lamp voltage limit is exceeded, which is determined by the allowable maximum lamp ignition current and the allowable maximum lamp ignition power, the comparator produces a switching signal and that the capacitor is coupled to ground via a resistor by means of the switching signal and is discharged by means of a second time constant, because in this particularly uncomplicated and cost-effective manner is determined a point in time, by merely measuring the lamp voltage, when the additional power is reduced after a start-up of the lamp. By means of the voltage applied to the capacitor, the duration and level of the additional power to be supplied is determined in an uncomplicated manner and with cost-effective components. Herein, it proves to be particularly beneficial that the capacitor is discharged during steady operation and not maximally charged as in the known state-of-the-art wherein the voltage of the charged capacitor, and thus the steady power nominal value, is dependent upon temperature-dependent residual, or leakage, current flowing through the capacitor. Capacitor voltage is reduced with increasing residual, or leakage, current, thereby leading to a power increase of the lamp, which exceeds the allowable light power and substantially reduces the life span of the lamp.

A capacitor substantially discharged during steadily operation, however, does not have any substantial residual, or leakage, current and remains discharged. The steady operation is therefore independent of the capacitor. However, the start-up operation is influenced by the capacitor's residual, or leakage, current; this residual, or leakage, current leads, especially in case of high operational temperatures, to reduction of start-up power (additional power) and of the maximum ignition current, thereby leading to a slower start-up of the lamp, yet having a positive effect upon the life span of the lamp and the power-supply apparatus affected by high temperatures.

It is beneficial that the second reference voltage source is a voltage stabilizer means and is fed from the battery, because in this uncomplicated and cost-effective manner, in cases of deviations of the voltage supplied by the voltage source, controlled or regulated voltage stabilization is achieved, thereby allowing the circuit to stay as best as possible within the time constants for charging and discharging the capacitor and to easily achieve a maximum charge of the capacitor.

A particularly uncomplicated and cost-effectively manufacturable embodiment of this invention is provided when the voltage stabilizer is a Z-diode with a series resistor.

Making the first reference voltage source and the second reference voltage source identical results in providing voltage in a particularly uncomplicated and reliable manner for the current/power control device.

It is beneficial that the switching comparator has an output terminal which, depending upon the switching status, is either open or connected to ground, thereby providing a particularly uncomplicated and cost-effective switching arrangement for switching between charging and discharging operations of the capacitor.

It is beneficial that the capacitor is a tantalytic capacitor, because in this manner it is ensured that, despite high temperatures in the power-supply apparatus, for example, in an arrangement with lamp proximity, the desired charge and discharge features are not influenced by excessive residual, or leakage, currents.

The embodiment of the power-supply apparatus of this invention described and claimed herein can be manufactured in a particularly uncomplicated and cost-effective manner and ensures highest reliability during operation of the power-supply apparatus. It is particularly beneficial to use this power-supply apparatus for ignition and operation of high-pressure gas discharge lamps in motor vehicle headlights, because, aside from the uncomplicated, cost-effective embodiment of this invention, a particularly good ignition operation of the high-pressure gas discharge lamp is provided which produces a predetermined light output, independently of its switching status, as quickly as possible and flicker-free, thereby increasing safety during operation of motor vehicles.

The embodiments of the invention in which an exclusive property or privilege are claimed and defined as follows:

1. A power supply apparatus for the ignition and operation of a high-pressure gas discharge lamp which is fed from a battery, comprising:

at least one current- and/or power-controlled voltage converter to be coupled to the high-pressure gas discharge lamp via an ignition device;

a current/power control device coupled to the voltage converter by means of an input terminal, to which is applied an input signal corresponding to a lamp voltage; and an output terminal of the current/power control means through which a current/power nominal value is fed to the voltage converter;

said current/power control device comprising:

a comparator which produces a switching signal dependent upon the input signal;

a capacitor;

a charging and discharging means for charging said capacitor via a circuit having a first time constant or a circuit having a second time constant dependent upon the produced switching signal; said capacitor being coupled to said output terminal whereby its voltage determines a level and duration of additional voltage, supplied to the high-pressure gas discharge lamp after ignition dependent upon operational status of the high-pressure gas discharge lamp and limited by an allowable maximum lamp current;

wherein the output terminal of the current/power control device is coupled to the capacitor and to a first reference voltage source via a voltage divider circuit, wherein the capacitor is coupled to a second reference voltage source and is charged with a first time constant when the power-supply apparatus is not activated, wherein, after activation of the power supply apparatus, and upon a lamp voltage limit being exceeded, which is determined by an allowable maximum lamp ignition current and by an allowable maximum lamp ignition power, the comparator produces a switching signal, and wherein the capacitor is coupled to ground via a resistor in response to the switching signal and is thereby discharged by means of a second time constant.

2. A power supply apparatus as in claim 1 wherein the second reference voltage source includes a voltage stabilizing means for providing stabilized voltage from a battery.

3. A power supply apparatus as in claim 2 wherein the voltage stabilizing means is a Zener diode and a series resistor.

4. A power supply apparatus as in claim 1 wherein the first reference voltage source and the second reference voltage source are identical and are fed permanently from the battery.

5. A power supply apparatus as in claim 1 wherein the switching comparator has an output terminal which is either open or ground-connected, depending upon a switched status.

6. A power supply apparatus as in claim 1 wherein the capacitor is a tantalytic capacitor.

7. A power supply apparatus as in claim 1 wherein a first electrode of the capacitor is connected to ground, wherein a second electrode of the capacitor is coupled to the output terminal via a fourth resistor and to a first terminal via a third resistor, wherein the first terminal is linked to the output terminal of the comparator and to one of the reference voltage sources via a second and first resistor, wherein one of the reference voltage sources is coupled to ground via a first resistor and a Zener diode, wherein an inverting input terminal of the comparator is coupled to the input terminal, wherein a non-inverting input terminal of the comparator is coupled to one of the reference voltage sources and wherein the output terminal is coupled to ground via a sixth resistor and to one of the reference voltage sources via a fifth resistor.

8. A power supply apparatus as in claim 1 wherein the power supply apparatus of the high-pressure gas discharge lamp is used for energizing motor vehicle headlights.

9. A power supply apparatus as in claim 1 wherein the lamp voltage limit is calculated from a quotient of the allowable maximum lamp ignition power and the allowable maximum of the lamp ignition current to a specific voltage limit.

* * * * *